UNITED STATES PATENT OFFICE.

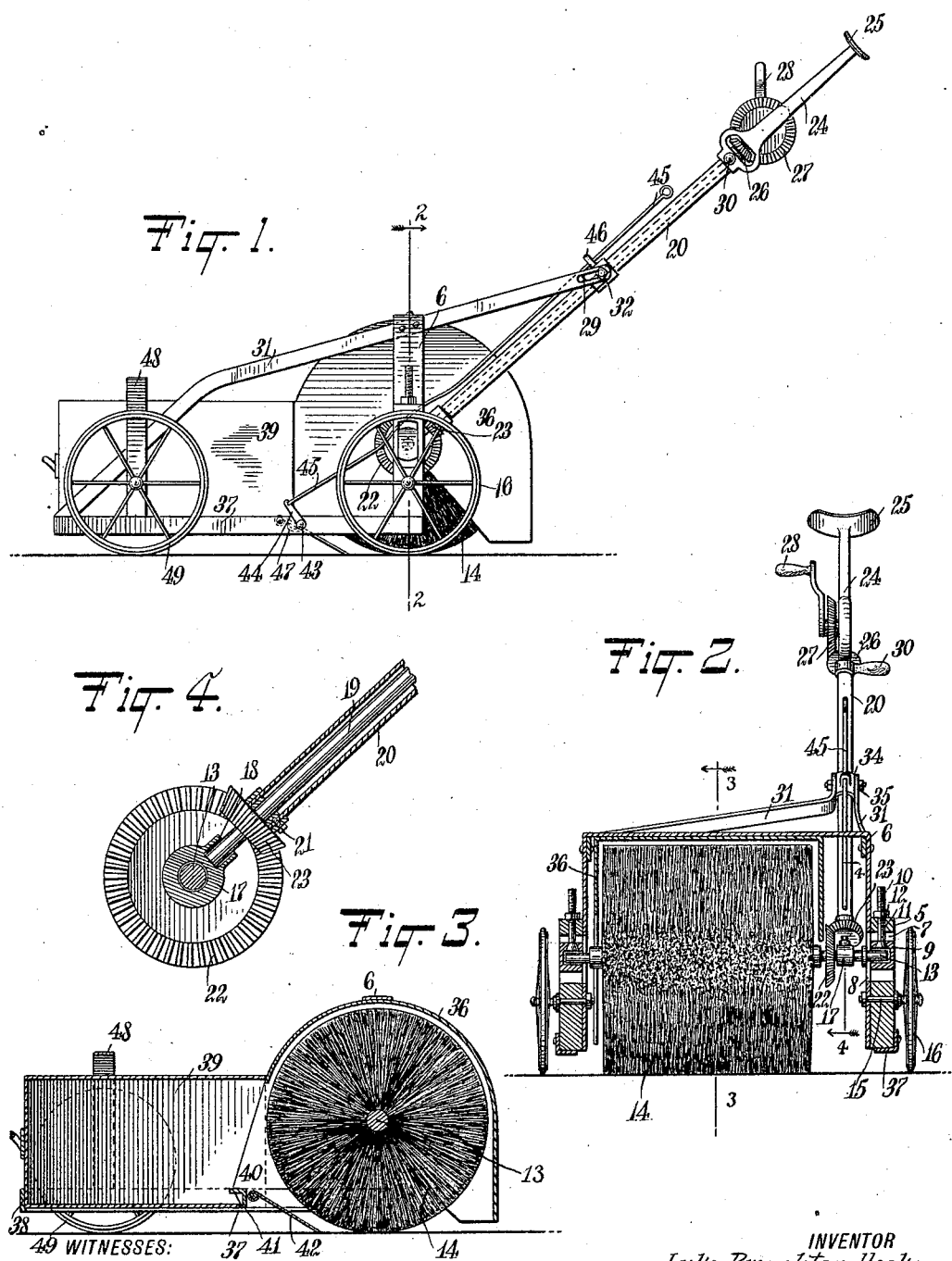

LUKE BROUGHTON HOOKER, OF SAN FRANCISCO, CALIFORNIA, ASSIGNOR OF ONE-HALF TO THOMAS WILSON, OF SAN FRANCISCO, CALIFORNIA.

SWEEPING-MACHINE.

1,000,912.  Specification of Letters Patent.  Patented Aug. 15, 1911.

Application filed July 16, 1910. Serial No. 572,304.

*To all whom it may concern:*

Be it known that I, LUKE B. HOOKER, a citizen of the United States, and a resident of San Francisco, in the county of San Francisco and State of California, have invented a new and Improved Sweeping-Machine, of which the following is a full, clear, and exact description.

My invention relates to sweeping machines, and it has for its object to provide a machine of this character, having means by which the rotary brush may be adjusted to any one of a plurality of positions relatively to the frame, with means by which the driving mechanism, supported by the frame, may be quickly adjusted for operating the rotary brush after it has been adjusted.

Another object of the invention is to provide a hand sweeping machine having a rotary brush which is operated from the arm of the machine, by which it is moved from place to place, the arm being provided with a handle on a crank, provided with mechanism for driving the rotary brush and with a second handle rigid with the arm, for guiding the machine.

Still another object of the invention is to provide a sweeping machine, the members of which are so proportioned and disposed and united as to make it possible to manufacture a strong and effective machine at comparatively little cost.

Still other objects of the invention will appear in the following complete description.

In this specification I will describe the preferred form of my invention, it being understood that the scope of the invention is defined in the appended claims.

Reference is to be had to the accompanying drawings forming a part of this specification, in which similar characters of reference indicate corresponding parts in all the views, and in which—

Figure 1 is a side elevation of the invention; Fig. 2 is a sectional view on the line 2—2 of Fig. 1; Fig. 3 is a sectional view on the line 3—3 of Fig. 2; and Fig. 4 is a sectional view on the line 4—4 of Fig. 2.

By referring to the drawings, it will be seen that the frame has side members 5 which are connected by an inverted U-shaped frame member 6, the lower ends of which are secured to the side frame members 5. There are openings 7 in the side frame members 5, there being also similar openings 8 in the lower ends of the frame member 6 which register with the openings 7. Bearing members 9 are disposed in the openings 7, the said bearing members having secured to them heads of screws 10, the screws 10 being disposed through orifices 11 in the upper portions of the side frame members 5, nuts 12 being provided, which mesh with the threaded portions of the screws 10, the nuts 12 being disposed against the top of the side frame members 5. Journaled in the bearings 9, is a shaft 13, to which is secured a brush 14. Axles 15 are mounted on the side frame members 5, wheels 16 being mounted on these axles 15 respectively. A collar 17 is mounted on the shaft 13, this collar 17 having a bearing 18 which is disposed at the lower end of a shaft 19, the shaft 19 being disposed in a sleeve 20 having a bearing 21 at its lower end, in which the shaft 19 is journaled. A bevel gear wheel 22 is secured to the shaft 13 and a bevel gear wheel 23, meshing with the bevel gear wheel 22, is secured to the shaft 19.

To the upper terminal of the sleeve 20, is secured an arm 24, to which is secured a curved plate 25. The upper terminal of the shaft 19 has a bevel gear 26 which meshes with a bevel gear 27 secured to a crank 28, which is journaled to the arm 24. To the sleeve 20, at the other side of this crank 28, there is secured a handle 30. Frame members 31 are secured to the forward ends of supports 37, which are, in turn, secured to the side frame members 5, these frame members 31 extending upwardly and rearwardly and being secured to the frame member 6. However, these frame members 31 extend rearwardly of the frame member 6 and have terminals with slots 29, through which extend bolts 32, these bolts 32 being secured to a member 34, which, in turn, is secured to the sleeve 20. Nuts 35 are provided to engage the free ends of the bolts 32, by which means the bolts are held firmly relatively to the frame members 31.

A curved hood 36 is secured to the frame member 6 and is disposed over the top of the brush 14, the sides of the hood 36, forward of the frame member 6, extending down to the side frame members 5. The forward ends of the supports 37 are connected by a transverse member 38. A dirt receptacle 39 is provided and is normally disposed back of the transverse member 38, the dirt receptacle 39 resting on the supports 37. The rear of this dirt receptacle 39 is open and communicates with the interior of the hood in which the brush 14 is disposed, the sides of the hood, at the forward ends, extending, at 40, into the rear portion of the dirt receptacle. A transverse sill 41 is secured to the rear portions 40 above the plane of the floor of the dirt receptacle 39. Pivoted to the sides of the hood member, immediately in the rear of the transverse sill member 41, there is a dust pan 42, the dust pan 42 extending downwardly and rearwardly in the direction of the brush 14 to the ground. A pin 43 is disposed in a bearing through one of the side frame members 5, an arm 44 being secured to this pin, to which, in turn, a rod is articulated, this rod 45 being bent upwardly parallel with the sleeve 20 and extending through an eye 46. The inner end of the pin 43 has a cam 47, for engaging the lower side of the dust pan 42 to raise it from the ground. An inverted U-shaped frame member 48 has its lower terminal secured to the supports 37, axles being secured to this inverted frame member 48, on which wheels 49 are mounted.

In using the invention, the operator presses his body against the curved plate 25 and grasps the crank 28 in his right hand and the handle 30 in his left. He is then able to push the machine along the floor, it being possible, at the same time, for him to steer the machine in any direction desired. When the operator desires to rotate the brush 14, he merely operates the crank 28, which causes the shaft 19 to rotate, thereby, with the gearing provided, rotating the shaft 13 and the brush 14. When the operator is through sweeping, the receptacle 39 may be removed and the dirt may be conveyed to vehicles to be removed. When, for any reason, it is desired to raise or lower the shaft 13 relatively to the frame, this may be done by means of the bolts 10 and their nuts 12, the nuts 35 being first unscrewed to permit the sleeve 20, with the shaft 19, to adjust themselves to the new position occupied by the shaft 13 and the collar 17. When the shaft 13 has been adjusted in place, the nuts 35 should be turned home, to hold the sleeve 20 in position with the gear wheel 23 on the shaft 19 meshing with the gear wheel 22 on the shaft 13.

Having thus described my invention, I claim as new and desire to secure by Letters Patent:

1. In a sweeping machine a frame having orifices, two bearing members having projections adapted to be disposed in the orifices, means for holding the projections in the orifices in a plurality of positions relatively to the frame, a shaft journaled in the bearing members, a brush secured to the shaft, a collar having a bearing in which the shaft is disposed, a second shaft journaled in the last-mentioned bearing, gearing connecting the two shafts, and means for rotating the second-mentioned shaft.

2. In a sweeping machine a frame having openings, serving as guideways, two bearing members adapted to travel in the guideways, means for holding the bearing members in a predetermined position relatively to the frame, a shaft journaled in the bearing members, a brush secured to the shaft, a collar in which the shaft is disposed, and means mounted on the collar for rotating the shaft.

3. In a sweeping machine, a frame, a shaft journaled to the frame, a brush secured to the shaft, a sleeve terminating in an arm secured to the frame, a collar having a bearing mounted on the shaft, a second shaft disposed in the sleeve and journaled in the bearing on the collar, gearing connecting the first and second shafts, a crank journaled to the arm, gearing connecting the crank and the second shaft, a handle secured to the sleeve, opposite the crank, and a curved plate secured to the rear terminal of the arm.

4. In a sweeping machine, a frame, two bearings, means for adjusting the bearings relatively to the frame, a shaft journaled in the bearings, a brush secured to the shaft, a collar having a bearing mounted on the shaft, a sleeve terminating in an arm, means for securing the sleeve to the frame, in a plurality of positions, a second shaft disposed in the sleeve, and journaled in the bearing in the collar, gearing connecting the first and the second shafts, a crank journaled to the arm, and gearing connecting the crank and the second shaft.

5. In a sweeping machine, a frame, two bearings, means for adjusting the bearings relatively to the frame, a shaft journaled in the bearings, a brush secured to the shaft, a sleeve, terminating in an arm, means for securing the sleeve to the frame in a plurality of positions, a second shaft, means for supporting the second shaft in the sleeve, gearing connecting the first and second shafts, a crank journaled to the arm, and gearing connecting the crank and the second shaft.

6. In a sweeping machine, a frame having slots, two bearings, means for adjusting the bearings relatively to the frame, a shaft journaled in the bearings, a brush secured to the shaft, a sleeve, terminating in an arm, bolts extending from the sleeve, disposed in the slots in the frame, nuts engaging the bolts, for holding the sleeve in a predetermined position relatively to the frame, a second shaft, disposed in the sleeve, gearing connecting the first and second shafts, a crank journaled to the arm, and gearing connecting the crank and the second-mentioned shaft.

7. In a sweeping machine a frame having openings, serving as guideways and orifices, bearing members having projections disposed for moving in the guideways, the projections extending through the orifices, means for holding the projections in a plurality of positions relatively to the frame, a shaft journaled in the bearing members, a brush secured to the shaft, a collar in which the shaft is disposed, and means mounted on the collar for rotating the shaft.

In testimony whereof I have signed my name to this specification in the presence of two subscribing witnesses.

LUKE BROUGHTON HOOKER.

Witnesses:
JAMES J. GLOVER,
H. O. WILDERS.

Copies of this patent may be obtained for five cents each, by addressing the "Commissioner of Patents, Washington, D. C."